R. C. DUNHAM.

Rubber-Coated Buckles and Rings.

No. 6,279. Reissued Feb. 9, 1875.

Witnesses:
Edw. W. Donn
M. Gardner.

Inventor:
Andrew Albright
by his atty, Assignee of Ralph C. Dunham
J. C. Clayton

THE GRAPHIC CO. PHOTO-LITH. 39 & 41 PARK PLACE, N.Y.

UNITED STATES PATENT OFFICE.

RALPH C. DUNHAM, OF NEW BRITAIN, CONNECTICUT, ASSIGNOR, BY MESNE ASSIGNMENTS, TO ANDREW ALBRIGHT, OF NEWARK, NEW JERSEY.

IMPROVEMENT IN RUBBER-COATED BUCKLES AND RINGS.

Specification forming part of Letters Patent No. 58,619, dated October 9, 1866; reissue No. 5,172, dated December 3, 1872; reissue No. 6,279, dated February 9, 1875; application filed December 12, 1874.

*To all whom it may concern:*

Be it known that RALPH C. DUNHAM, of New Britain, in the State of Connecticut, has invented a new and useful Improvement in Buckles and Rings, of which the following is a full and exact specification, reference being had to the accompanying drawings, forming a part of this specification.

Figure 1:
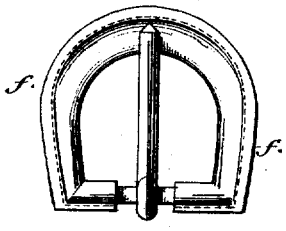
Figure 2:
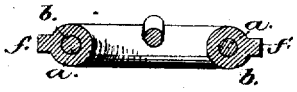

Figures 1 and 2 represent a coated buckle.

This invention consists in making buckles and rings of metal and a coating of rubber or other gum, the said coating being provided with a projecting rib formed out of the composition, upon which may be impressed imitation stitching.

In the drawing, *a* shows the metal core. *b* shows that part of the composition which coats or, in whole or in part, surrounds the core. *f* shows the lap, or fold, or projection, or strengthening-rib on the outer edge of the buckle or other article. Upon this rib are indentations to imitate stitching, as shown by dotted lines.

Metallic rings and buckles, hooks, bits, terrets, and other articles of harness and carriage trimmings, have heretofore been protected from rust, and ornamented chiefly by coatings of leather, lacquer, vitreous composition, or metallic plating; but the coating of leather which has been sewed on, so as to leave a projecting fold or lap on the outer edge, has been considered the best and most beautiful; but in no case has such a coating been applied by the use of a composition or gum provided with the lap or apparent fold.

The object of this invention is to produce an imitation or substitute for such leather-coated goods, the imitation being better and more desirable than the thing imitated. One essential feature is the projection *f*. This projecting rib or apparent fold *f* greatly increases the thickness and strength of the coating on the outer or most exposed part of the article. It not only serves as an ornament, and gives the resemblance to leather-covered goods, but materially adds to the strength, durability, and utility of the coating as such, but also of the buckle or other article. When the composition or coating is applied in a thin sheet to the core it is more liable to crack and split off without the strengthening-rib *f* than with it. When the coating is bent around the core *a* without any lap or projection the surface of contact between the two edges is so small that the welding is less perfect and secure than where the lap affords a larger contact-surface. For this reason metallic rings and buckles, and articles of the same character, when provided with such a ribbed coating, are stronger, more durable, and better than similar articles with the plain or unribbed coating.

When I desire to cover a buckle or other article with a coating of vulcanized rubber or other gum I take the plastic rubber in strips of the desired width and thickness, and cause it to adhere closely to the article, so applying it as to have a double thickness, or extra quantity, or fold, *f*, on the outer edge, sufficient pressure being used to make the two parts of the fold cohere or weld together. In this condition the article is put into the heater and vulcanized. It is then finished in the usual manner practiced with hard-rubber goods. The imitation stitching can then be added by the use of any suitable tool.

I claim as the invention of RALPH C. DUNHAM—

1. A buckle or ring composed of a metal core and a coating of rubber or other gum, the said coating being provided with a projecting rib suitable for receiving imitation stitching, substantially as set forth.

2. A buckle or ring composed of a metal core and a coating of composition, provided with a projecting rib suitable for receiving imitation stitching, substantially as set forth.

ANDREW ALBRIGHT,
Assignee of RALPH C. DUNHAM.

Witnesses:
JOSEPH C. LEVI,
J. C. CLAYTON.